INVENTOR:
HARRY W. RUPPLE
ATTORNEYS

March 13, 1934.  H. W. RUPPLE  1,950,931
STOCK FEEDING MECHANISM FOR AUTOMATIC MACHINE TOOLS
Filed Dec. 7, 1931  4 Sheets-Sheet 3
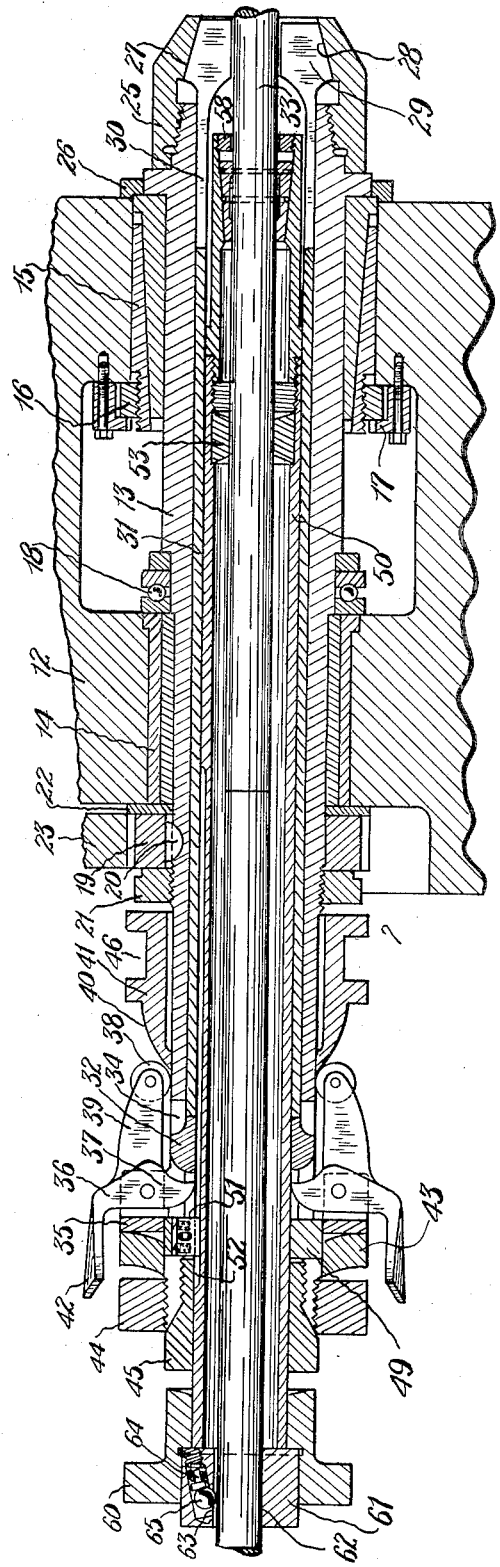
INVENTOR:
HARRY W. RUPPLE
Kwis Hudson & Kent
ATTORNEYS March 13, 1934.  H. W. RUPPLE  1,950,931

STOCK FEEDING MECHANISM FOR AUTOMATIC MACHINE TOOLS

Filed Dec. 7, 1931  4 Sheets-Sheet 4

INVENTOR:
HARRY W. RUPPLE

Kwis Hudson & Kent
ATTORNEYS

Patented Mar. 13, 1934

1,950,931

UNITED STATES PATENT OFFICE 1,950,931

STOCK FEEDING MECHANISM FOR AUTOMATIC MACHINE TOOLS

Harry W. Rupple, Shaker Heights, Ohio, assignor to The Cleveland Automatic Machine Company, Cleveland, Ohio, a corporation of Ohio Application December 7, 1931, Serial No. 579,518

10 Claims. (Cl. 29—62)

The present invention relates to automatic metal working machines and more particularly to the stock feeding mechanism thereof.

The invention is particularly applicable to automatic machines of the multiple position type wherein work bars or blanks are automatically fed through rotatable spindles at predetermined intervals and operated upon by one or a plurality of tools. In machines of this general character the tools are usually carried on suitable slides etc. and are advanced toward and from the work in predetermined timed relation to the feeding operations. The work is clamped in automatic chucks carried by the spindles during the machining operations which chucks are released during the feeding operation.

An object of the present invention is the provision of a novel and improved chuck operating and stock feeding mechanism for automatic machines of the type referred to which will be simple, rugged and reliable in operation and economic to construct.

Another object of the invention is the provision of a novel stock feeding mechanism for feeding a plurality of stock bars or blanks to a plurality of spindles, provided with means to prevent injury to the machine in the event that the stock became jammed etc. therein and to compensate for variations in the feed collets and gauge stops.

Another object of the invention is the provision of a novel feed tube or shell for the spindles of an automatic machine tool of either the position or turret type, which will engage and feed the work at one or both ends of said spindle.

Further objects and advantages of the invention will be apparent to those skilled in the art from the following description of the preferred embodiment of the invention, described with reference to the accompanying drawings, in which:

Fig. 3 is a sectional view taken through one of the spindles with the work shown in elevation.

Fig. 4 is a perspective view with part of the feed tube broken away showing the work engaging jaws carried at the righthand end of the feed tube as viewed in Fig. 3.

Figure 1:
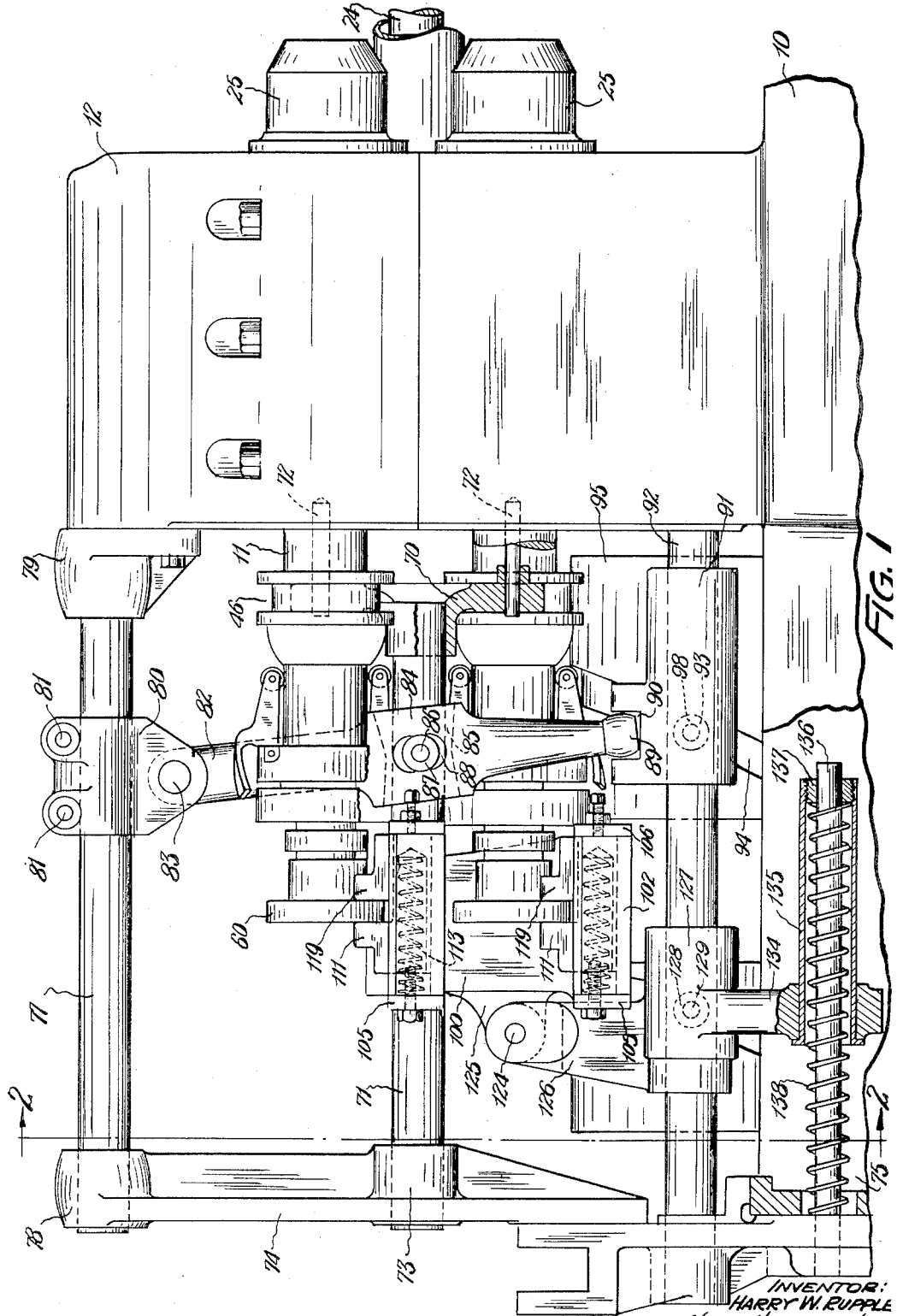
Figure 1 is a front elevational view, with portions broken away, of the work spindle end of an automatic machine tool provided with the chuck operating and stock feeding mechanism of the present invention.
Figure 2:
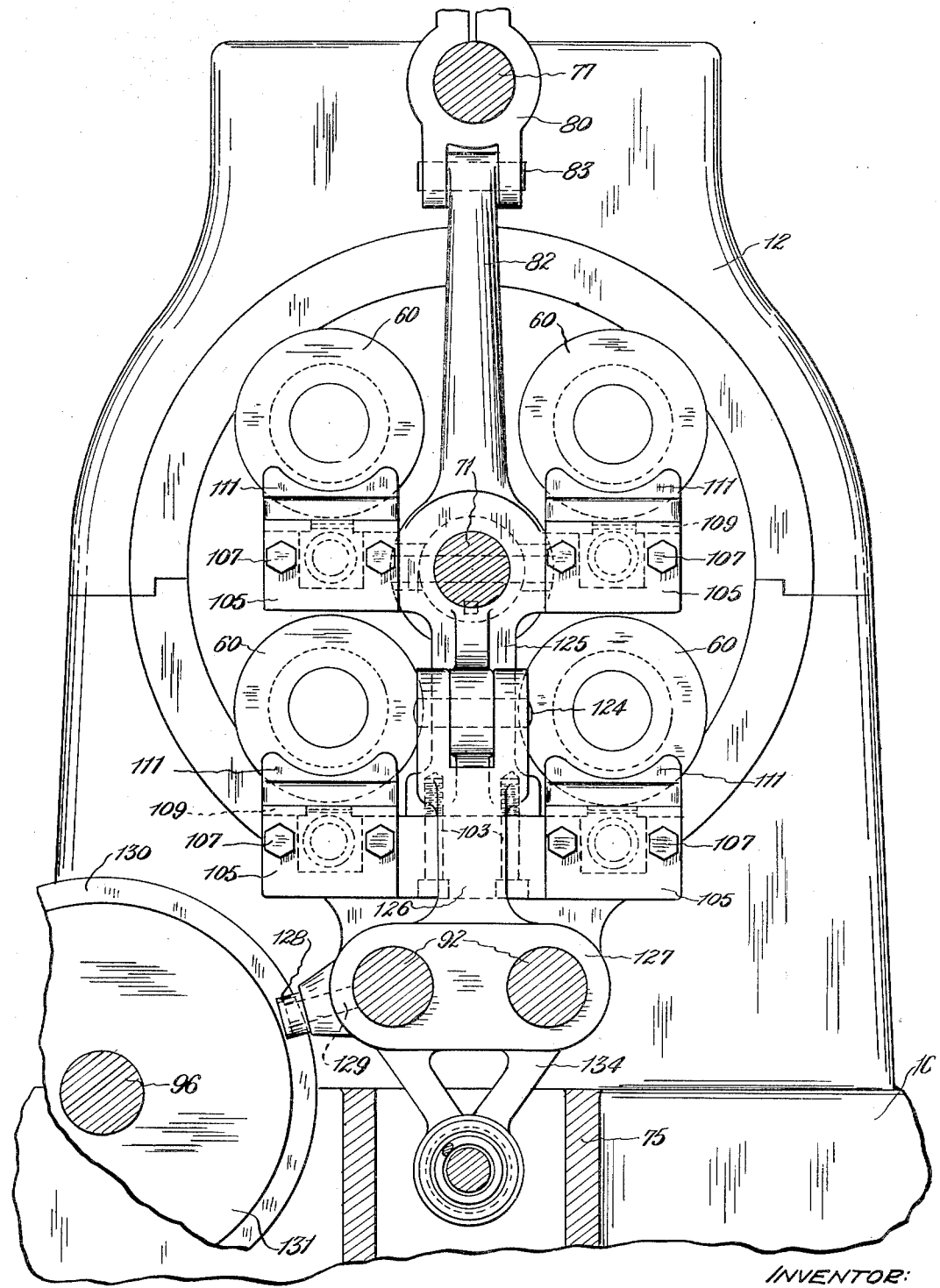
Fig. 2 is a view taken on the line 2—2 of Fig. 1.
Figure 5:
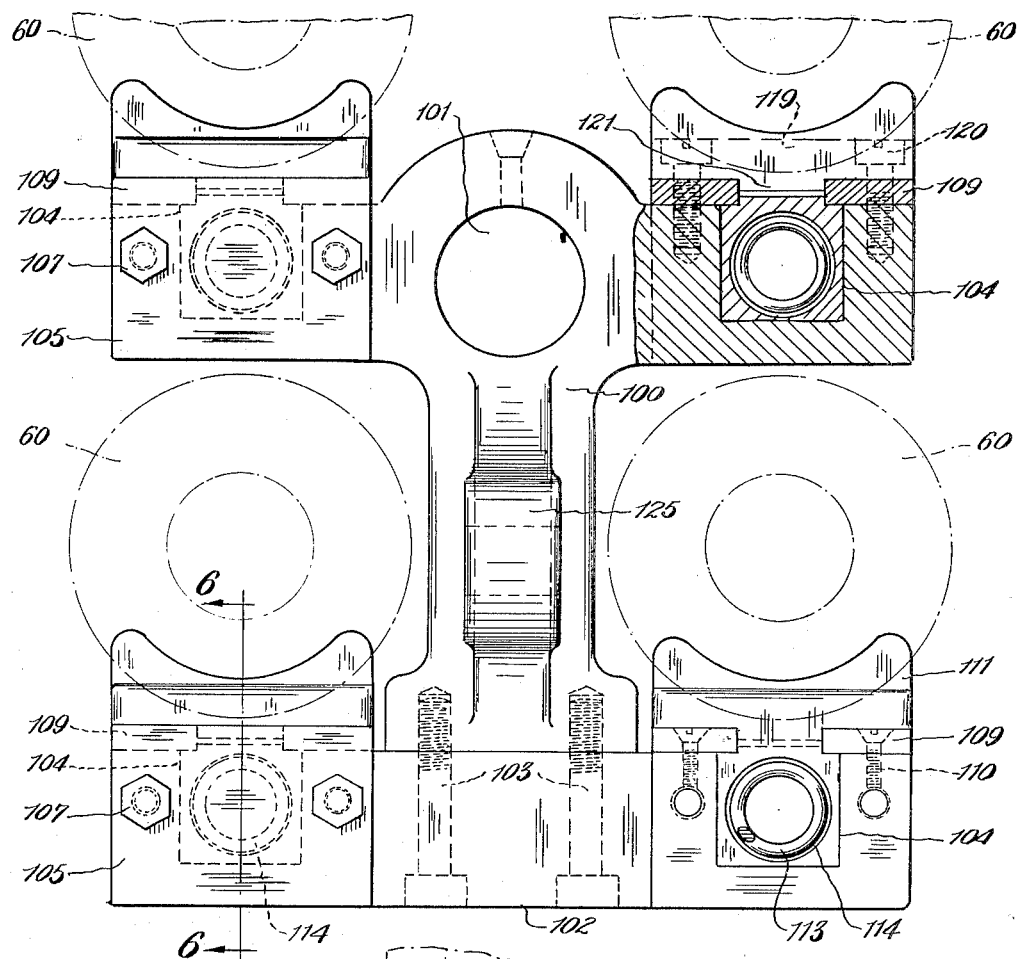
Figure 6:
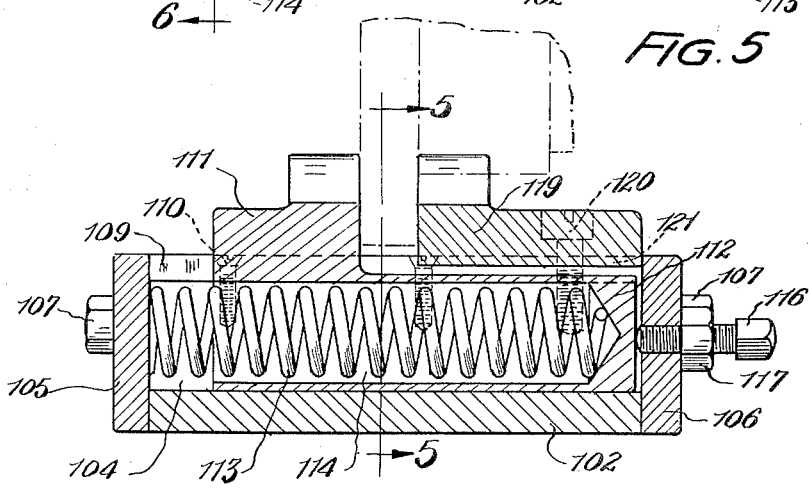

Fig. 5 is an enlarged detail view of a part of the feed mechanism shown in Figs. 1 and 2, with the upper front part shown in section on the line 5—5 of Fig. 6, and the lower front end plate removed, and Fig. 6 is a sectional view on the line 6—6 of Fig. 5.

Similar reference characters indicate corresponding parts throughout the several figures of the drawings.

Referring to the drawings, reference character 10 designates the bed of an automatic machine tool of which the spindle end alone is illustrated. A plurality of spindles 11, in the present instance four, are rotatably supported in a plurality of longitudinal apertures in a spindle head 12 formed on one end of the bed 10.

The spindles 11 are identical in construction and only one will be described in detail. Each of the spindles 11 include a spindle tube 13 rotatably supported in tapered bushings 14 and 15 provided with an adjusting nut 16, to take up wear, held in engagement with the spindle head 12 by clamps 17 bolted or otherwise secured to the spindle head. An anti-friction thrust bearing 18 is provided to take the longitudinal thrust of the spindle. The spindle tube 13 carries, at the left of the spindle head 12 as viewed in Figs. 1 and 3, a gear 19 keyed thereto by means of a key 20 and held in position by a nut 21 threaded on the exterior of the spindle tube 13. A wear plate 22 is positioned between the gear 19 and the spindle head 12. The central gear 19 is permanently in mesh with a gear 23 fixed to a shaft 24 projecting through the center of the spindle head 12 and driven from the main drive of the machine in a manner well known in the art.

The spindle tube 13 is provided at the right-hand end as viewed in Fig. 3, with a spindle head 25 threaded thereon and a spindle head guard 26. The spindle head 25 has a tapered surface 27 on the interior thereof adapted to be engaged by the surfaces 28 of the jaws 29 of the resilient chuck collet 30 fixed to one end of a chuck tube 31 slidably supported inside of the spindle tube 13. The other end of the chuck tube 31 is provided with chuck tube heads 32 which project through slots 34 formed in the end of spindle tube 13. The jaws 29 of the chuck collet 30 are caused to engage and disengage the work, indicated by the reference character 33, as the chuck tube is reciprocated longitudinally of the spindle tube 13, by the action of the cooperating tapered surfaces 27 and 28.

A collar-shaped finger block 35 non-rotatably but slidably supported on the spindle tube 13 carries a pair of bell crank fingers 36 pivotally mounted thereon. The short arms 37 of the bell crank fingers 36 engage the chuck tube heads and move the chuck tube in a direction to close the chuck jaws 29 when the bell crank fingers are rotated in a counterclockwise direction about their pivots, by the engagement of rollers 38 carried on the long arm 39 with a cam surface 40 on a chuck thimble 41. In operation counterweights 42 formed integral with the fingers 36 continuously urges them towards their disengaged position.

Movement of the finger block 35 toward the left as viewed in Fig. 3 is limited by a spring 43 and an adjusting nut 44 both of which are mounted on the exterior of the spindle tube 13. A binding nut 45 is threaded into the interior of the spindle tube 13 and locks the nut 44 in any adjusted position. The adjusting nut 44 is used to adjust the jaws 29 for different sizes of work and the spring 43 compensates for slight variations in the size of the work, permitting the finger block 35 to slide along the spindle tube 13 if the resistance to the closing of the jaws becomes excessive. The chuck thimble 41 is provided with an annular groove 46 about the periphery thereof adapted to be engaged by mechanism hereinafter described, for moving the same to open and close the chuck jaws 29 in predetermined timed relation to the feeding operation.

A feed tube 50 is slidably supported in the interior of the spindle tube 13 inside of the chuck tube 31 and relative rotation between said feed and spindle tubes is prevented by a spring pressed key 51, carried by a key holder 49, extending through the slot 34 in the spindle tube 13 and into a groove 52 in the feed tube. A bushing 53 fixed to the interior of the feed tube supports the work 33 projecting therethrough.

The feed tube 50 carries at the righthand end thereof a chuck type feed collet consisting of a tubular member 54 provided with a tapered surface 55 on the interior thereof, and a frusto-conical member 56 made in three sections held together by resilient rings 57 positioned in grooves 48. A nut 58 threaded into the end of the tubular member 54 limits the movement of the frusto-conical member 56 in one direction. The work projects through a suitable opening 59 in the frusto-conical member 56 and the member is caused to engage and release the work as it is reciprocated longitudinally thereof.

A flange shaped feed tube head 60 fixed to the left-hand end of the feed tube as viewed in Fig. 3, carries a chuck type feed collet secured thereto in any suitable manner. The feed collet illustrated consists of a collar member 61 provided with a suitable opening 62 through which the work projects and an aperture 63 extending at an angle to the longitudinal axis of the spindle and opening into the interior of the collar member 61. A spring pressed plunger 64 positioned in the aperture 63 resiliently urges a spherical member 65 towards the opening of the aperture 63, which opening is smaller than said spherical member and prevents the same from dropping out when the work is removed from the spindle. From the construction illustrated it will be apparent that as the feed collet is moved in one direction relative to the work the spherical member 65 will be wedged between the work and the top surface of the aperture 63 causing the work to be carried along with the feed collet. As the feed collet is moved in the reverse direction the spherical member 65 will be moved into the aperture 63 against the resistance of the spring and the collet permitted to move over the work. The flange shaped feed tube heads 60 are engaged by mechanism hereafter described for reciprocating the feed tubes to perform the feeding operation in predetermined timed relation to the other operations of the machine.

The chuck thimbles 41 are engaged and reciprocated by a disc-shaped shoe member 70 fixed to one end of a shaft 71 and provided with portions which extend into the annular grooves 46 of the chuck thimbles 41. The shoe member 70 is slidably supported on pins 72 fixed to the spindle head 12 and the shaft 71 is slidably supported at the end remote from the shoe member 70 in a boss 73 formed in a bracket 74 attached to a horn 75 of the bed 10.

A rod or shaft 77 supported at one end in a boss 78 formed on the bracket 74 and at the other end in a bracket 79 secured to the spindle head 12 carries a split collar 80 adjustably secured thereto by the bolts 81. A lever 82 pivotally connected at the upper end to the collar 80 by means of a pin 83 is provided near the center thereof with an enlarged portion 84 having an opening 85 through which the shaft 71 projects. A pin 86 fixed to the shaft 71 carries a pair of rollers 87 one on either side of the shaft 71 which engage in elongated slots 88 formed in the enlarged portion 84 of the lever 82.

A finished head 89 formed on the lower end of lever 82 engages in a slot 90 formed on the top of a member 91 slidably mounted on a pair of rods 92 fixed at one end in the spindle head 12 and at the other end in the bracket 74. The member 91 carries a cam roller 98 rotatably supported on a pin 93 fixed to the member 91. The cam roller 98 engages in and is operated by a cam groove 94 formed on a cam drum 95 fixed to the main cam shaft 96 of the machine. The construction is such that rotation of the cam drum 95, through the cam groove 94 and the cam roller 98, reciprocates the member 91 together with the lever 81, the shaft 71, and the shoe member 70 to open and close the chuck in predetermined timed relation to the other operations of the machine.

A T-shaped bracket 100, see Fig. 5, is provided with an opening 101 by means of which it is slidably supported on the shaft 71 carries a bottom plate 102 secured to the vertical leg thereof by the bolts 103. Channels 104 formed in the upper surfaces of the horizontal arms of the bracket 100 and the bottom plate 102 extend from one end of the bracket 100 and the plate 102 to the other, and are closed at the left-hand end, as viewed in Figs. 1 and 6, by end plates 105 and at the other end by end plates 106 secured thereto as by bolts 107.

Cover plates 109 secured to the bracket 100 and the plate 102 adjacent the channels 104 by the screws 110, together with the channels 104 form guide surfaces for slidable shoe members 111. The shoe members 111 have an elongated rectangular bottom part 112 which extends into channel 104 and is retained therein by the cover plates 109. The shoe members 111 engage the left-hand sides of the feed tube heads 60, shown in dot-dash lines in Figs. 5 and 6, and are continuously urged toward the right as viewed in Figs. 1 and 6 by a spring 113 compressed between end plates 105 and the bottom of an aperture 114 formed in the part 112 of the shoe members 111. Adjusting screws 116 carried by the end plates 106 and locked in an adjusted position by lock nuts 117 limits the extent of movement of the shoe members 111 in one direction.

Shoe members 119 adapted to engage the right-hand sides of the fed tube heads 60 are fixed to the bracket 100 and the bottom plate 102 on top of the cover plates 109 by the screws 120. The shoe members 119 are provided with a downwardly extending tongue 121 which projects between the cover plates 109 to a slight extent.

The bracket 100 is provided with a boss 125 to which an arm 126 of a member 127 is pivotally connected by a pin 124. The member 127 is slidably supported on the rods 92 and carries a cam roller rotatably supported on a pin fixed thereto. The cam roller 128 engages a cam plate 130 of a cam drum 131 fixed to the cam shaft 96.

The member 127 has a projection 134 formed integral therewith and extending downwardly therefrom into the horn 75. A tube 135 slidably supported at one end on a rod 136 fixed to the bracket 74, by a plug member 137 threaded into the interior of the tube, is fixed to the projection 134 in any suitable manner. A spring 138 compressed between the bracket 74 and the bottom of the tube 135 continuously urges the member 127 toward the right, as viewed in Fig. 1, and the cam roller 128 into engagement with the cam plate 130. The construction is such that the member 127 and the fed tube 50 are moved to perform the feeding operation by the spring 138 under the control of the cam plate 130.

It is believed that the operation of the machine will be understood from the above description from which it will be apparent that a novel stock feeding mechanism for machines of the type referred to has been provided. The chuck jaws are opened and closed in predetermined timed relation to the feeding operations all of which is controlled from the main cam shaft of the machine. The spring 138 imparts the feeding movement to the feed tubes 50 under the control of the cam plate 130 which prevents injury to the parts should the work become jammed etc. After the feed tube has advanced the work through the spindle the chuck jaws 29 engage the same and the feed tube is withdrawn over the work to its retracted position in preparation for the next succeeding feeding operation. The two feed collets one on either end of the feed tube permits lengths of work to be fed without interruption; the following length of work being advanced by the rear collet while the forward length of work is being fed by the forward collet. The words "clutch type" used throughout the specification and claims with reference to the feed collets, designate feed collets of the engaging and releasing type as distinguished from constant friction collets such as the spring or resilient finger type, which exert a constant friction upon the stock during both the feed and return movements.

The preferred embodiment of the invention has been illustrated and described, and I do not wish to be limited to the particular construction shown, which may be varied within the scope of the invention, and I particularly point out and claim as my invention:

1. In a machine of the character described the combination of a frame, a plurality of spindles rotatably supported by said frame, feed tubes supported by said spindles for feeding work therethrough, flanges on said feed tubes, a bracket slidably supported on said frame, a plurality of members supported by said bracket adapted to engage one side of said flanges, a plurality of slidable members supported by said bracket adapted to engage the other side of said flanges, resilient means for urging said slidable members into engagement with said flanges, and means for reciprocating said bracket.

2. In a machine of the character described, the combination of a frame, a spindle rotatably supported by said frame, and means adapted to feed work through said spindle comprising a feed tube slidably supported by said spindle, a member slidably supported by said frame, means for reciprocating said member in predetermined timed relation to the other operations of the machine, a second member slidably supported by said member adapted to engage said feed tube and move the same in a direction to feed the work through said work spindle upon reciprocation of said member, and yieldable means between said second member and said member adapted to yield under predetermined feeding load.

3. In a machine of the character described, the combination of a frame, a plurality of spindles rotatably supported by said frame, and means adapted to feed work through said spindles comprising feed tubes slidably supported by said spindles, a bracket slidably supported by said frame, means for reciprocating said bracket in predetermined timed relation to the other operations of the machine, and a plurality of yieldable means supported by said bracket adapted to engage said feed tubes and move the same in a direction to feed the work through said spindles upon reciprocation of said bracket.

4. In a machine of the character described, the combination of a frame, a plurality of spindles rotatably supported by said frame, and means adapted to feed work through said spindles comprising a plurality of feed tubes slidably supported by said spindles, a bracket slidably supported by said frame, means for reciprocating said bracket in predetermined timed relation to the other operations of said machine, a plurality of members slidably supported by said bracket adapted to engage said feed tubes and move the same in a direction to feed the work through said spindles upon reciprocation of said bracket in one direction, and yieldable means between said members and said bracket adapted to yield under predetermined feeding load.

5. In a machine of the character described, the combination of a frame, a spindle rotatably supported by said frame, and means adapted to feed work through said spindle comprising a feed tube slidably supported by said spindle, a member slidably supported by said frame, means for reciprocating said member in predetermined timed relation to the other operations of the machine, a second member slidably supported by said member adapted to engage said feed tube and move the same in a direction to feed the work through said spindle upon reciprocation of said member, yieldable means between said second member and said member adapted to yield under predetermined feeding load, and means supported by said member adapted to engage and move said feed tube in a direction to return the same to its feeding position upon reciprocation of said member in the reverse direction.

6. In a machine of the character described, the combination of a frame, a plurality of spindles rotatably supported by said frame, and means adapted to feed work through said spindles comprising feed tubes slidably supported by said spindles, a bracket slidably supported by said frame, means for reciprocating said bracket in predetermined timed relation to the other operations of the machine, a plurality of yieldable means supported by said bracket adapted to engage said feed tubes and move the same in a direction to feed the work through said spindles upon reciprocation of said bracket in one direction, and means on said bracket adapted to engage and move said feed tubes in a direction to return the same to their feeding positions upon reciprocation of said bracket in the reverse direction.

7. In a machine of the character described, the combination of a frame, a plurality of spindles rotatably supported by said frame, and means adapted to feed work through said spindles comprising a plurality of feed tubes slidably supported by said spindles, a bracket slidably supported by said frame, means for reciprocating said bracket in predetermined timed relation to the other operations of said machine, a plurality of members slidably supported by said bracket adapted to engage said feed tubes and move the same in a direction to feed the work through said spindles upon reciprocation of said bracket in one direction, yieldable means between said members and said bracket adapted to yield under predetermined feeding load, and means supported by said bracket adapted to engage said feed tubes and move the same in a direction to return them to their feeding positions upon reciprocation of said bracket in a reverse direction.

8. In a machine of the character described, the combination of a frame, a spindle rotatably supported by said frame and adapted to have work fed through the center thereof, a chuck carried at one end of said spindle, means for operating said chuck, a feed tube slidably supported by said spindle, a clutch type feed collet on the end of said feed tube remote from said chuck adapted to engage the work when the feed tube is moved in one direction to feed the same through said spindle, and means for reciprocating said feed tube in predetermined timed relation to the operations of said chuck.

9. In a machine of the character described, the combination of a frame, a spindle rotatably supported by said frame and adapted to have work fed through the center thereof, a chuck supported at one end of said spindle, means for operating said chuck, a feed tube slidably supported by said spindle, a clutch type feed collet supported by said feed tube adjacent the end thereof remote from said chuck adapted to engage and feed work through said spindle upon movement of said feed tube in one direction and to release said work and slide over the same upon movement in the reverse direction, and means for reciprocating said feed tube in predetermined timed relation to the operations of said chuck.

10. In a machine of the character described, the combination of a frame, a spindle rotatably supported by said frame, means for rotating said spindle, a chuck carried by said spindle, means for operating said chuck at predetermined intervals, a feed tube slidably supported within said spindle, a feed collet attached to said feed tube, said feed collet comprising a tubular member attached to said feed tube and having a cylindrical aperture opening into the interior thereof, the axis of said cylindrical aperture being inclined to the axis of said feed tube, a spherical member in said aperture adjacent said opening, a spring pressed plunger in the bottom of said aperture adapted to resiliently urge said spherical member toward the axis of said feed tube, means for retaining said spherical member within said aperture, and means for reciprocating said feed tube in predetermined timed relation to the operation of said chuck.

HARRY W. RUPPLE.